Patented Feb. 19, 1935

1,992,160

UNITED STATES PATENT OFFICE 1,992,160

WETTING, EMULSIFYING, AND WASHING AGENT

Charles A. Thomas, Wayne, Pa., assignor to The Sharples Solvents Corporation, Philadelphia, Pa., a corporation No Drawing. Application August 23, 1933, Serial No. 686,476

3 Claims. (Cl. 252—1)

The present invention relates to agents adapted to be used for wetting, emulsifying and washing purposes. It rests upon the discovery that the sulphonic acids of aryl hydrocarbons having neuclear hydrogen substituted by hydrocarbons formed by the polymerization of olefins, as well as the alkali metal salts of such acids, possess remarkable detergent and wetting properties and are capable of reducing the surface tension of water to an unusual degree when dissolved therein.

When benzene or naphthalene or substitution products of these compounds, for example, are substituted on the neucleus by polymerization products of this type and the substituted compounds are sulphonated to produce the corresponding sulphonic acids, the water solutions of these compounds as well as the solutions of their alkali metal salts exhibit detergent and wetting properties which render them useful for a large number of purposes, such as the wetting of textile fibers and general detergent use. They may be used as detergents without addition of other ingredients or they may be mixed with other detergents, such as ordinary soaps, in the formulation of detergent compositions.

Compositions adapted for use in accordance with the invention may be formed by any of the known methods of preparing compounds of this general type. It is possible, for example, to preliminarily produce the desired polymer or mixture of polymers by polymerization of olefin material in the presence of a catalyst such as sulphuric acid, aluminum chloride, or zinc chloride and thereafter condense the polymerized product so produced with benzene or naphthalene to produce a neuclear substituted benzene or naphthalene and finally sulphonate the neuclear substituted product so obtained.

The polymerized compound or mixture of compounds to be condensed upon the aryl neucleus may be initially mixed with an excess of the aryl compound in question, such as benzene or naphthalene, and the mixture thereafter cooled and zinc chloride or aluminum chloride gradually added to the cooled mixture during agitation of the mixture. At the completion of the condensation reaction the mixture may be neutralized, washed and treated with sulphuric acid to improve its color. After a second neutralization treatment, the remaining mixture is washed and thereafter fractionated in vacuo to yield a relatively pure mixture of substituted aryl compounds.

Similar aryl compounds may likewise be produced by chlorination of the polymerized olefin materials and condensation of the chlorides so formed, in accordance with the well-known Friedel and Crafts reaction by the addition of aluminum chloride and the aryl group which is to constitute the neucleus of the substituted sulphonic acid to be produced.

The corresponding sulphonic acids may be produced from the substituted aryl compounds by treatment with a strong sulphonating agent, such as oleum, the substituted aryl compounds being gradually added to the oleum during stirring. At the completion of the sulphonating operation, water is added to the mixture and the viscous layer containing the desired sulphonic acid is separated from the residue. This layer may thereafter be neutralized with caustic soda and stirred and heated over an air bath until solid. The same results may be attained and the color improved by dehydrating the product in a vacuum drier, while stirring constantly. When crushed, the material so obtained yields a hydroscopic product which ranges from water white to brown in color and possesses remarkable wetting and detergent properties. Compounds of this type formed by the condensation of polymers containing from eight to twenty carbon atoms in the side chain are particularly valuable for these purposes. The sulphonated condensation product of diamylene with naphthalene, for example, has been found to be a very valuable detergent. The present invention is applicable to the preparation and use of mixtures of such compounds varying considerably in side-chain carbon content as well as to other mixtures containing compounds of only slight variation in side-chain carbon content.

Modifications will be obvious to those skilled in the art and I do not therefore wish to be limited except by the scope of the sub-joined claims.

I claim:

1. The method of effecting washing, emulsifying and wetting operations which comprises applying to the object to be treated water and an agent chosen from the class consisting of aryl sulphonic acids having neuclear hydrogen substituted by polymerized olefin containing from eight to twenty carbon atoms in the polymer, and the alkali metal salts of such neuclear substituted acids.

2. The method of effecting washing, emulsifying and wetting operations which comprises applying to the object to be treated water and an agent chosen from the class consisting of benzene and naphthalene sulphonic acids having neuclear hydrogen substituted by polymerized olefin containing from eight to twenty carbon atoms in the polymer, and the alkali metal salts of such neuclear substituted acids.

3. A washing, emulsifying and wetting agent comprising essentially a chemical compound chosen from the class consisting of aryl sulphonic acids having neuclear hydrogen substituted by polymerized olefin containing from eight to twenty carbon atoms in the polymer, and the alkali metal salts of such neuclear substituted acids.

CHARLES A. THOMAS.